United States Patent
Cheong et al.

(10) Patent No.: US 10,750,182 B2
(45) Date of Patent: Aug. 18, 2020

(54) EMBEDDED CODEC CIRCUITRY FOR VISUAL QUALITY BASED ALLOCATION OF REFINEMENT BITS

(71) Applicant: SONY CORPORATION, Tokyo (JP)

(72) Inventors: Hye-Yeon Cheong, San Jose, CA (US); Ali Tabatabai, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 79 days.

(21) Appl. No.: 16/196,470

(22) Filed: Nov. 20, 2018

(65) Prior Publication Data
US 2020/0162739 A1    May 21, 2020

(51) Int. Cl.
*H04N 19/13* (2014.01)
*H04N 19/176* (2014.01)
*H04N 19/146* (2014.01)
*H04N 19/119* (2014.01)

(52) U.S. Cl.
CPC .......... *H04N 19/13* (2014.11); *H04N 19/119* (2014.11); *H04N 19/146* (2014.11); *H04N 19/176* (2014.11)

(58) Field of Classification Search
CPC .... H04N 19/13; H04N 19/119; H04N 19/146; H04N 19/176
See application file for complete search history.

(56) References Cited

U.S. PATENT DOCUMENTS

| | | | |
|---|---|---|---|
| 7,031,537 B2 | 4/2006 | Schwartz et al. | |
| 7,676,107 B2 | 3/2010 | Gordon | |
| 7,702,170 B2 | 4/2010 | Hu | |
| 8,406,297 B2 | 3/2013 | Lu et al. | |
| 8,526,745 B2 | 9/2013 | Liu et al. | |
| 8,634,668 B2 | 1/2014 | Gharavi-Alkhansari et al. | |
| 2007/0071090 A1* | 3/2007 | Peng | H04N 19/184 375/240.2 |
| 2008/0123739 A1 | 5/2008 | Reznic et al. | |
| 2014/0269903 A1 | 9/2014 | McCarthy et al. | |
| 2018/0139471 A1* | 5/2018 | Ikeda | H04N 19/65 |
| 2019/0222853 A1* | 7/2019 | Keinert | H04N 19/129 |

OTHER PUBLICATIONS

Hannuksela, et al., "Sub-Picture: ROI Coding and Unequal Error Protection", IEEE ICIP 2002, 2002 IEEE, pp. 537-540.
Tang, et al, "Visual Sensitivity Guided Bit Allocation for Video Coding", IEEE Transactions on Multimedia, vol. 3, Issue 1, Feb. 2006, pp. 11-18.

* cited by examiner

*Primary Examiner* — Farzana Hossain
(74) *Attorney, Agent, or Firm* — Chip Law Group

(57) ABSTRACT

An embedded codec (EBC) circuitry includes encoder circuitry to encode a plurality of sub-blocks of an image block by an entropy coding scheme to generate a plurality of encoded data blocks. Each encoded data block includes a first plurality of bit-planes and a second plurality of bit-planes. The first plurality of bit-planes include a plurality of entropy coded bits. The encoder circuitry determines a count of refinement bits of a plurality of refinement bits, for an encoded data block of the plurality of encoded data blocks, based on a quality measure of the plurality of encoded data blocks. The quality measure represents a count of the plurality of entropy coded bits in each encoded data block. The encoder circuitry allocates the count of refinement bits in the second plurality of bit-planes of the encoded data block.

20 Claims, 6 Drawing Sheets

US 10,750,182 B2

1

EMBEDDED CODEC CIRCUITRY FOR VISUAL QUALITY BASED ALLOCATION OF REFINEMENT BITS

CROSS-REFERENCE TO RELATED APPLICATIONS/INCORPORATION BY REFERENCE

None.

FIELD

Various embodiments of the disclosure relate to an embedded codec for image and video compression or decompression. More specifically, various embodiments of the disclosure relate to embedded codec circuitry for visual quality based allocation of refinement bits.

BACKGROUND

With recent advancements in imaging technologies, there is an increasing demand for on-chip codecs in image capturing and display devices that can handle compression and storage of different images or video in wide variety of image resolutions (e.g., low to high resolution images/video). Currently, an image or video may be subjected to multiple coding techniques, for example, quantization, residual prediction, entropy coding, and the like, to achieve a desired compression. Typically, after the entropy coding, there may be still un-coded bits available in bit-planes within a bit budget of an encoded image block. In certain scenarios, the un-coded bits may be refined by allocating equal number of refinement bits in a predetermined sequence in each encoded image sub-block. In such scenarios, the allocation of equal number of refinement bits in each encoded image sub-block of different visual quality may not only result in visible image artifacts, but may also lead to compression inefficiency and sub-optimal memory usage, especially in on-chip codes where it is desirable to achieve an area efficiency with respect to throughput while minimizing an on-chip memory usage.

Further limitations and disadvantages of conventional and traditional approaches will become apparent to one skill in the art, through comparison of described systems with some aspects of the present disclosure, as set forth in the remainder of the present application and with reference to the drawings.

SUMMARY

An embedded codec (EBC) circuitry and a method for visual quality based allocation of refinement bits are provided, substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

2 other circuitries for visual quality based allocation of refinement bits, in accordance with an embodiment of the disclosure.

Figure 1:
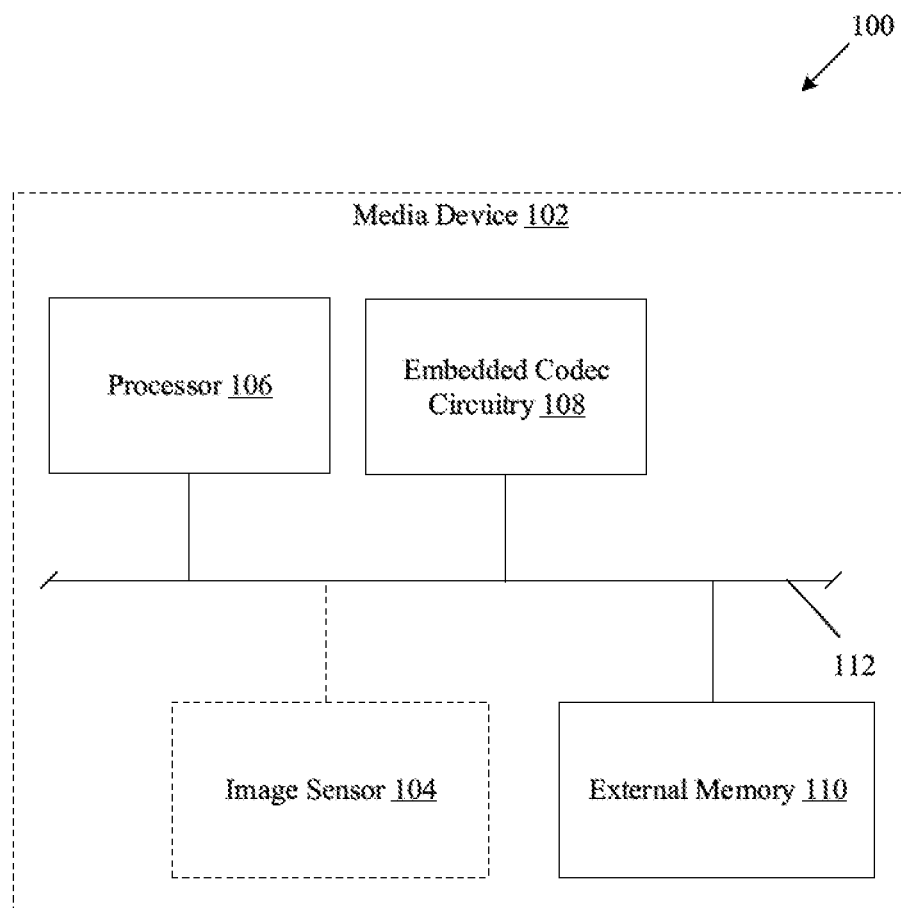
FIG. 1 is a block diagram that illustrates an exemplary media device with an embedded codec (EBC) circuitry.
Figure 2:
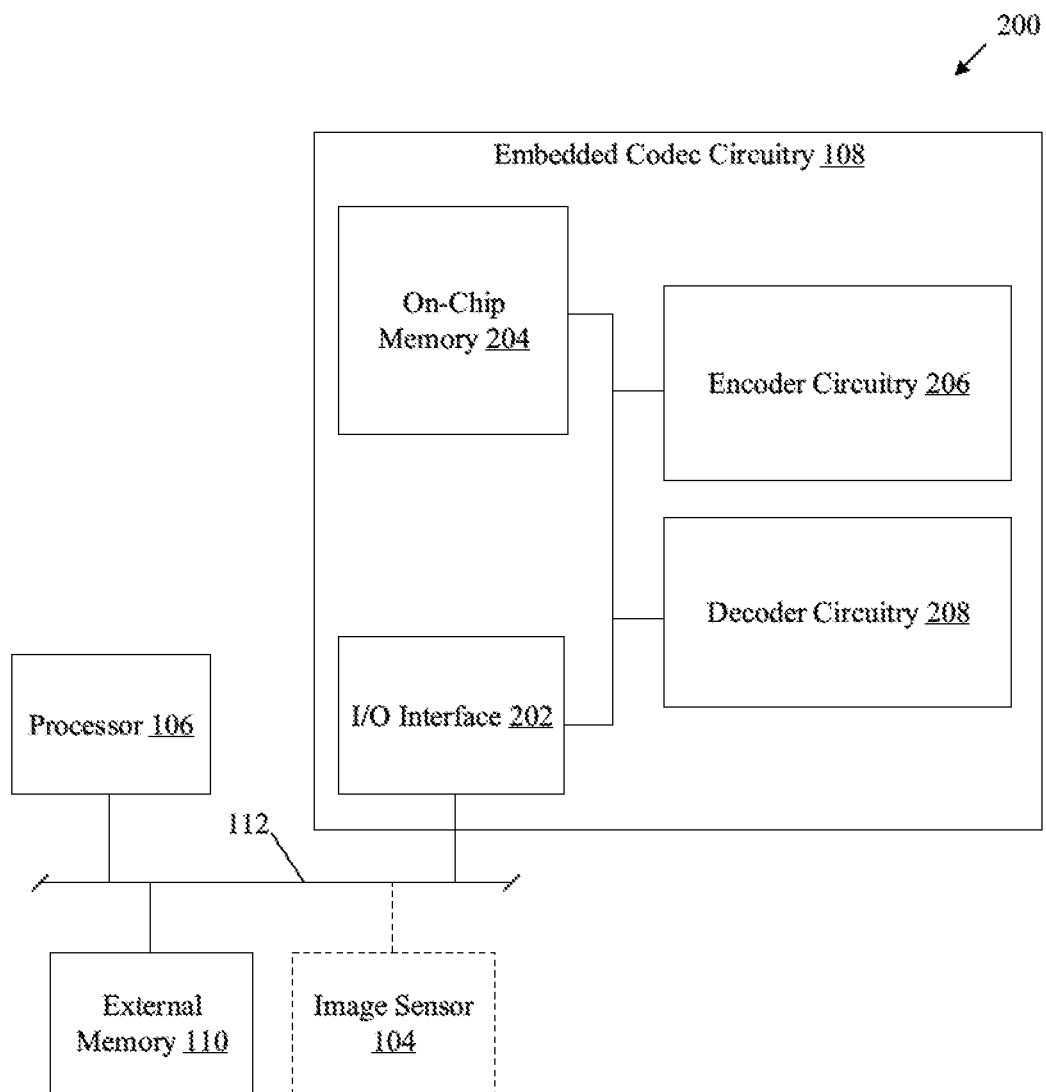

FIG. 2 is a block diagram that illustrates the EBC circuitry of FIG. 1 with various peripheral components for visual quality based allocation of refinement bits, in accordance with an embodiment of the disclosure.

Figure 3:
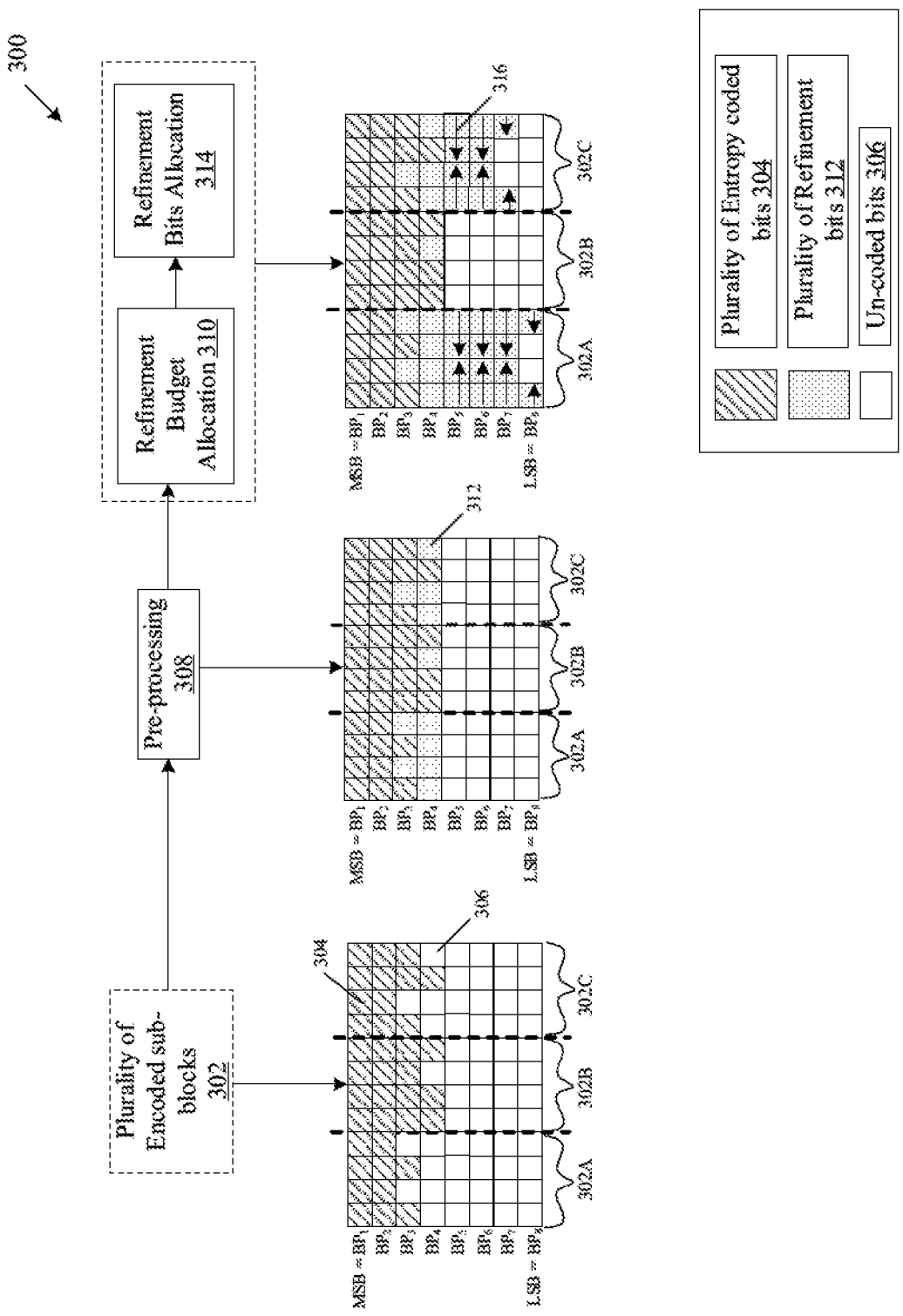

FIG. 3 illustrates allocation of refinement bits, by the EBC circuitry of FIG. 2, in accordance with an embodiment of the disclosure. FIG. 3 is explained in conjunction with elements from FIG. 1 and FIG. 2.

Figure 4A:
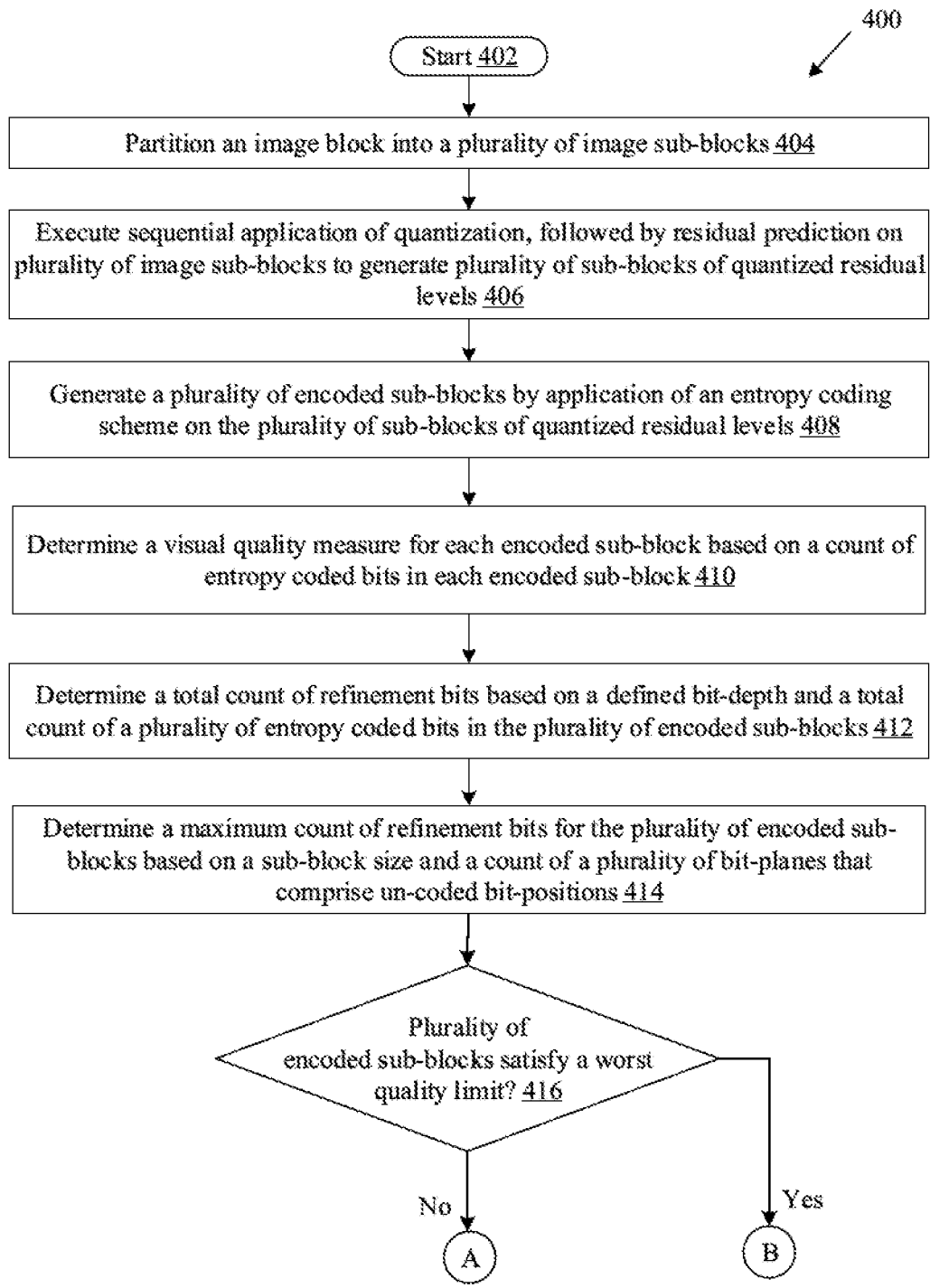
Figure 4B:
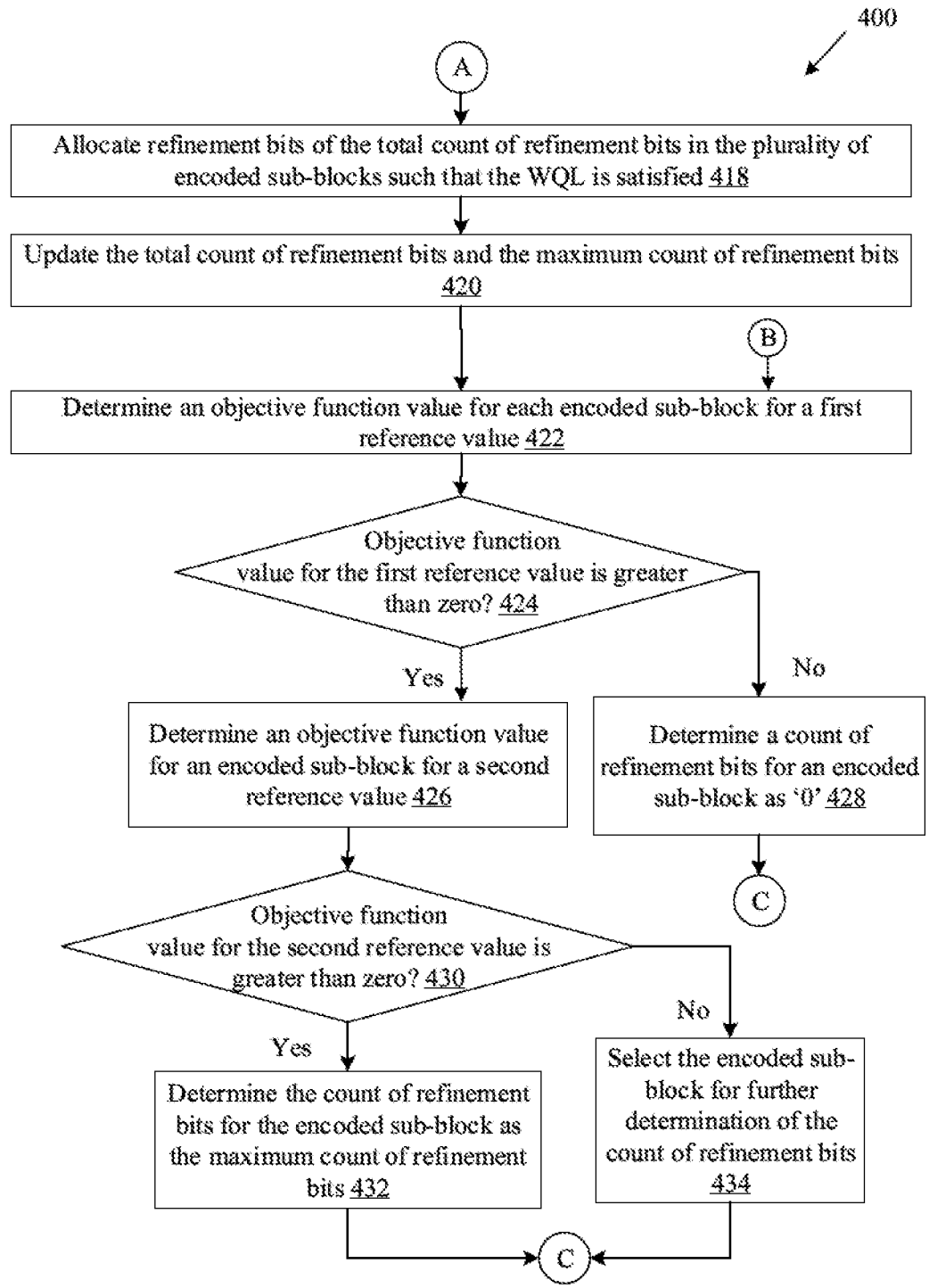
Figure 4C:
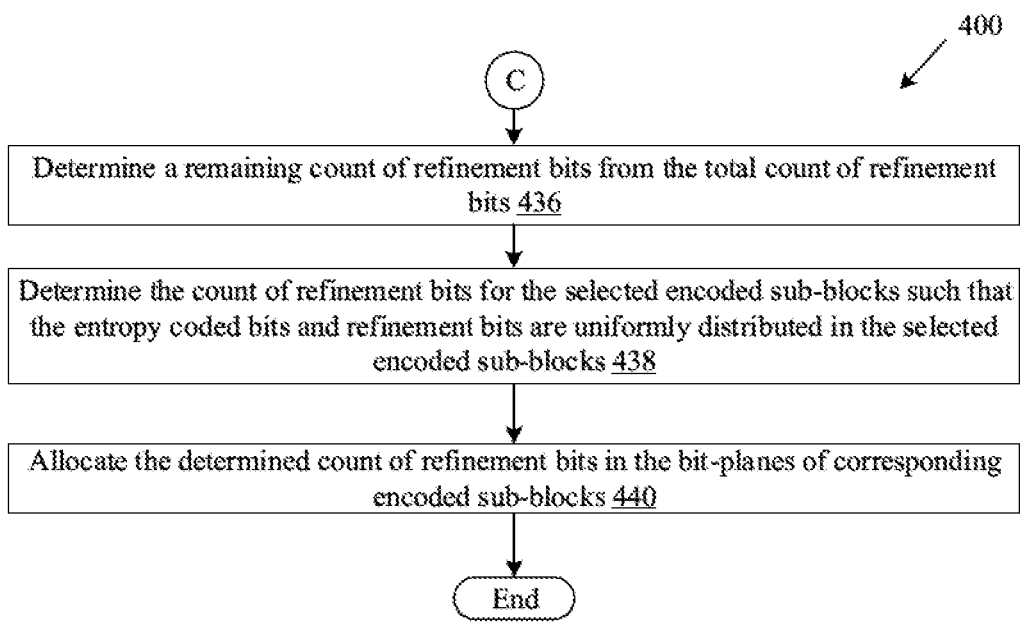

FIGS. 4A, 4B, and 4C, collectively, depicts a flowchart that illustrates an exemplary method for visual quality based allocation of refinement bits, in accordance with an embodiment of the disclosure.

DETAILED DESCRIPTION

Various embodiments of the present disclosure may be found in a method and embedded codec (EBC) circuitry for visual quality based allocation of refinement bits. The EBC circuitry may include a memory and encoder circuitry that handles generation of encoded bit-stream of an image block (a one-dimensional (1D) image block or a 2D image block). The disclosed EBC circuitry encodes image sub-blocks (1D image sub-blocks or 2D image blocks) of the image block to generate encoded data blocks, which include entropy coded bits in bit-planes. The number of bit-planes may be defined prior to encoding operation (i.e., the encoding of the image sub-blocks), as a defined bit-depth. The disclosed EBC circuitry determines a number of refinement bits to be allocated in the bit-planes of each encoded data block (i.e., each sub-block of the image block), based on a visual quality measure of each encoded data block. The visual quality measure may be indicative of visually error tolerance of each encoded data block. According to the human visual system (HVS), any coding artifacts may be more visible in a low textured image region (also referred to as visually less error tolerant i.e., visually important area) as compared to a highly textured image region. The differentiation at a sub-block level further renders an opportunity to adaptively reduce an allocation of refinement bits to an image sub-block based on the visual quality of the image sub-block. For example, an image sub-block corresponding to the highly textured image region may not require all un-coded bit-positions to be refined, and whereas an image sub-block corresponding to the low textured image region may require a greater number of un-coded bit positions to be refined. The selective allocation of refinement bits at the sub-block level improves the image quality as the image sub-block (e.g., a visually important area) which requires a greater number of bits is allocated the maximum number of refinement bits. As a result of such selective allocation of refinement bits at the sub-block level, compression efficiency is significantly improved without an adverse impact on quality of encoded image. Further, an area efficiency with respect to throughput of the disclosed EBC circuitry is enhanced and an on-chip memory usage is optimized.

FIG. 1 is a block diagram that illustrates an exemplary media device with an embedded codec (EBC) circuitry and other circuitries for visual quality based allocation of refinement bits, in accordance with an embodiment of the disclosure. With reference to FIG. 1, there is shown a media device 102 that includes a processor 106, an embedded codec (EBC) circuitry 108, and an external memory 110. In some embodiments, an image sensor 104 may be communicatively coupled to the processor 106, the EBC circuitry 108, and the external memory 110. There is further shown a system bus 112 that interconnects the image sensor 104, the processor 106, the EBC circuitry 108, and the external memory 110.

The media device 102 may comprise suitable logic, circuitry, and interfaces that may be configured to store uncompressed raw images and/or videos as encoded (i.e. compressed) images and/or videos in the external memory 110. The media device 102 may be further configured to manage encoding as well as decoding of media content (for example, encoded images and/or videos) and further playback of the decoded media content at the media device 102. The media device 102 may include a dedicated on-chip codec (such as the EBC circuitry 108) for an offline (without the need for Internet/network) processing and compression/decompression of images/video. In some embodiments, the media device 102 may also include one or more image sensors (such as the image sensor 104) to capture images in a raw image file format, which is an uncompressed file format. In such cases, the captured image may be encoded by the EBC circuitry 108 of the media device 102. Examples of the media device 102 may include, but are not limited to, a digital camera, a portable communication device (e.g. laptops, smartphones, tablets, phablets, smart watches, smart glasses, etc.), a media server, a workstation, a desktop computer, and augmented reality/Virtual Reality/Mixed Reality (AR/VR/MR) devices.

Although not shown in FIG. 1, the media device 102 may also include a network interface that may be configured to manage sharing of encoded and/or raw uncompressed images and/or videos with other peripheral or peer-connected devices, through a communication network (also not shown). The detailed description of the network interface and the communication network has been omitted from the present disclosure for the sake of brevity.

The image sensor 104 may comprise suitable logic, circuitry, and interfaces that may be configured to capture a raw uncompressed image or a sequence of raw uncompressed images of a scene in a field-of-view (FOV) of the image sensor 104. The image sensor 104 may be implemented as an active pixel sensor, such as a complementary-metal-oxide semiconductor (CMOS) sensor. In such implementation, the image sensor 104 may be configured to execute progressive scan (line-by-line) of each row or column of pixels (i.e., each 1D pixel-array of a 2D pixel array) on a sensor core of the CMOS sensor. The progressive scan may be a vertical scan (column wise) or a horizontal scan (row wise). In some embodiments, instead of an active pixel sensor, the image sensor 104 may be implemented as one of a passive pixel sensor (such as a charged coupled device (CCD) sensor, an oversampled binary image sensor, a planar Fourier capture array (PFCA), a back-illuminated (BSI or BI) sensor, and the like. Although not shown, the image sensor 104 may also include a specialized microprocessor (or a microcontroller) that is configured to operate in accordance with image data from the image sensor 104, a graphic processing unit (GPU) to process images stored in a frame buffer, and/or a memory integrated with the image sensor 104.

The processor 106 may comprise suitable logic, circuitry, and interfaces that may be configured to execute a set of instructions stored in a dedicated memory (e.g., the external memory 110 or an on-chip memory in the EBC circuitry 108). The processor 106 may be implemented based on a number of processor technologies known in the art. Examples of the processor 106 may include, but are not limited to, a Graphical Processing Unit (GPU), a co-processor (such as a specialized image co-processor) for a processor, a specialized digital signal processor, a Central Processing Unit (CPU), an x86-based processor, an x64-based processor, a Reduced Instruction Set Computing (RISC) processor, an Application-Specific Integrated Circuit (ASIC) processor, a Complex Instruction Set Computing (CISC) processor.

The EBC circuitry 108 may comprise suitable logic, circuitry, and interfaces that may be configured to encode an image block (e.g., a 16×1 or an 8×1 image block) as per a specific compression factor. The EBC circuitry 108 may be further configured to refine the encoded image block, in response to instructions received at the EBC circuitry 108. In some embodiments, the image block may be part of an input image (i.e. a raw uncompressed image) or a pixel array (row or column) retrieved directly from a read out register of the image sensor 104, following a row-wise or a column-wise scan by the image sensor 104. The EBC circuitry 108 may further manage storage of a bit-stream of encoded image block in the external memory 110 or may manage transfer of the bit-stream of encoded image to other media devices via dedicated communication networks.

The EBC circuitry 108 may be implemented as a specialized hardware encoder/decoder interfaced with the other computational circuitries of the media device 102. In such implementation, the EBC circuitry 108 may be associated with a specific form factor on a specific computational circuitry. Examples of the specific computational circuitry may include, but are not limited to, a field programmable gate array (FPGA), programmable logic devices (PLDs), an application specific integrated circuit (ASIC), a programmable ASIC (PL-ASIC), application specific integrated parts (ASSPs), and a System-on-Chip (SOC) based on standard microprocessors (MPUs) or digital signal processors (DSPs). In accordance with another embodiment, the EBC circuitry 108 may also interface with a graphical processing unit (GPU) to parallelize operations of the EBC circuitry 108. In accordance with yet another embodiment, the EBC circuitry 108 may be implemented as a combination of programmable instructions stored in a memory and logical units (or programmable logic units) on a hardware circuitry of the media device 102.

The external memory 110 may comprise suitable logic, circuitry, and interfaces that may be configured to store an input image (uncompressed raw or encoded) or a sequence of input images. The external memory 110 may be further configured to act as an image buffer to store raw uncompressed image blocks retrieved directly from the image sensor 104. Additionally, the external memory 110 may store instructions associated with sequential encoding/decoding schemes that may be applied, by the EBC circuitry 108, to generate a bit-stream of encoded image block. In an exemplary embodiment, the external memory 110 may be a persistent storage memory or a dynamic random access memory (DRAM) that may be externally interfaced with the EBC circuitry 108. In another exemplary embodiment, the external memory 110 may be static random access memory (SRAM) circuits that may be externally interfaced with the EBC circuitry 108. Further examples of implementation of the external memory 110 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, or a Secure Digital (SD) card.

In some embodiments, the EBC circuitry 108 may also provide support (e.g., a backward compatibility) for different other codec standards that may include Advanced Video Codec (AVC)/Media Experts Group (MPEG-4/AVC) or H.264, MPEG-4/HEVC or H.265, and the like. Additionally, the video codec may be supported by other codec libraries that may include FFmpeg, Xvid, DIVx, VP1-9, Windows Media Codec, fast forwarding or transcoding every video format to AVS format (FFays), and the like.

The system bus 112 may be a hardware bus that may include a set of data channels (or conductive paths) to different components of the media device 102. Alternatively stated, the system bus 112 may interconnect at least data ports, address ports, and control signal ports of different components of the media device 102. For example, the system bus 112 may interconnect the image sensor 104, the processor 106, the EBC circuitry 108, the external memory 110, and other circuitries to each other. The system bus 112 may be configured to facilitate a serial data communication or parallelized data communication between different components within the media device 102. Examples of the system bus 112 may include an 8-bit parallel single system bus, a 16-bit parallel single system bus, a 32-bit parallel single system bus, a 64-bit parallel single system bus, a serial data bus, and the like.

In operation, an image block (a 1D image block or a 2D image block) may be received by the media device 102. In some embodiments, a 1D image block or a sequence of 1D image blocks may be retrieved directly from a read-out register of an on-chip image sensor (such as the image sensor 104) or a camera device interfaced with the media device 102. In other embodiments, 1D image block or the sequence of 1D image blocks may be retrieved from an uncompressed raw input image stored in a persistent storage, such as the external memory 110, of the media device 102 or received externally from other media storage devices, such as cameras, data servers, etc. However, the operation of the disclosed EBC circuitry 108 is not limited to the 1D image block. The EBC circuitry 108 may be further configured to receive a 2D image block directly from the read-out register of the on-chip image sensor (such as the image sensor 104) or the camera device interfaced with the media device 102.

The EBC circuitry 108 may be configured to retrieve the image block from the external memory 110 or directly from the read out register of the image sensor 104. The EBC circuitry 108 may be configured to execute a sequential encoding scheme on the image block to generate a bit-stream of encoded image block. The bit-stream of encoded image block may include header information that may indicate the sequential encoding scheme applied at encoding of the image block, to obtain the bit-stream of encoded image block. In one implementation, the sequential encoding scheme may include a sequential application of quantization (e.g., bitplane quantization) followed by residual prediction (e.g., DPCM), and an entropy coding scheme (e.g., entropy coding of DPCM output). HVS refinement may be applied thereafter.

In a sequential encoding scheme, the EBC circuitry 108 may be configured to partition the image block for example, a "16×1" image block, into a plurality of image sub-blocks. The plurality of image sub-blocks may correspond to a logical partition of the image block into regions that have sharp change in pixel values at edges. For example, a "16×1" image block may be partitioned into four "4×1" image sub-blocks, where each "4×1" image sub-block may include strong edges, i.e. a larger difference in pixel values at edges of two consecutive "4×1" image sub-blocks. In one implementation, the image sub-block size may be determined based on prior experimentations or may be specified based on a user input. For example, it may be observed that "8×1" image sub-block results in optimum image quality, then a "32×1" image block may be partitioned into four image sub-blocks, each of size "8×1".

The EBC circuitry 108 may be further configured to quantize a plurality of pixel values in each image sub-block to generate a plurality of quantized levels. The plurality of quantized levels may be separated from each other by a plurality of discretized quantization bins. A step size for the plurality of quantization bins may be further selected adaptively or uniformly to efficiently quantize a sub-block of pixel values into a plurality of quantized levels. Each quantized level may be a mid-value from an upper bound and a lower bound of a quantization bin, for example, a quantization bin of "(155,175)" may include a quantized level of "(155+175)/2", i.e. "165".

The plurality of quantization bins may be determined based on a quantization parameter (QP), which may vary with a defined rate in accordance with an adaptive quantization scheme to encode or decode the media content. The QP may vary from 0 to a bit depth of a bit-stream of encoded image block. For example, a QP for an 8-bit bit-stream of compressed image block may be selected as "7" for a first sub-block and "0" for a second block, which may indicate that the first sub-block may be quantized with a finer step size as compared to the second block and the second block may not be quantized at all. In certain embodiments, a quantization scheme that is implemented on the plurality of pixel values of each sub-block of the plurality of sub-blocks is a bit-plane quantization scheme.

The EBC circuitry 108 may be further configured to apply a residual prediction scheme on a plurality of sub-blocks of quantized levels, where each sub-block may include a plurality of quantized levels. After application of the residual prediction scheme, a plurality of sub-blocks of quantized residual levels may be obtained from a plurality of sub-blocks of quantized levels. The plurality of sub-blocks of quantized residual levels for an image block may be stored in a memory, such as the external memory 110 or an on-chip memory (e.g., a dedicated SRAM or an on-chip cache) in the EBC circuitry 108. Examples of the residual prediction scheme may include, but are not limited to, a Pulse Coded Modulation (PCM) scheme, a Differential Pulse Code Modulation (DPCM) scheme, or an Adaptive DPCM (AD-PCM) scheme. In DPCM and ADPCM schemes, instead of utilizing each quantized level, a residue is predicted from reference quantization levels.

The EBC circuitry 108 may be further configured to encode the plurality of sub-blocks of quantized residual levels by application of an entropy coding scheme. As a result, a plurality of encoded data blocks may be obtained, which include a plurality of bit-planes. The plurality of bit-planes may include entropy coded bits as well as un-coded bit-positions that may be refined with allocation of refinement bits. The entropy coding scheme may include, but is not limited to, a Huffman coding scheme, an exponential Golomb coding scheme, a progressive Golomb coding scheme, a Golomb-Rice coding scheme, and a combination of the Huffman coding scheme and the exponential Golomb coding scheme.

The quantization of the image block may reduce the number of bit-planes which may contain bits corresponding to the quantized levels. As an example, a 16×1 image block may comprise pixel values corresponding to a bit-depth of 10 (i.e., bits for each pixel value may be in 10 bit-planes). After quantization, the 16×1 image block may be encoded by application of the DPCM scheme and the entropy coding scheme, and the number of bit-planes that comprise bits may be reduced to '4'. The remaining '6' bit-planes may be allocated with refinement bits based on available bit-budget. The refinement bits may be allocated in accordance with human visual system (HVS) i.e., an image sub-block, corresponding to a visually important area, may be allocated with a higher number of refinement bits as compared to a visually less-important area. The count of refinement bits determined for each sub-block of the image block may be different based on respective visual importance. The determined count of refinement bits may be then allocated in the remaining '6' bit-planes, starting from a higher bit-plane to a lower bit-plane.

In order to allocate the refinement bits in an encoded data block, the EBC circuitry 108 may be further configured to estimate a measure of visual quality for each encoded data block based on a count of entropy coded bits in each encoded data block. The measure of visual quality may be equal to the count of entropy coded bits, as a highly textured area may require a greater number of entropy coded bits as compared to a low textured area. The measure of visual quality may indicate the visual error tolerance capability of the encoded data block. For example, the highly textured area may be more error tolerant as any coding artifact may not be easily visible in the highly textured area as compared to the low textured area. The number of refinement bits to be allocated may depend on the available bit-budget and the number of entropy coded bits after compression. For example, for an input image block of 32 samples having 12 bit depth, it may be desired to have an output of 10 bit depth. The available bit budget is 32×10=320 bits. After applying the encoding scheme, it may be found that the output occupies only 220 bits. Thus, 100 (i.e. in case of 220-320 bid budget in an example) bit-positions are available for allocation of refinement bits to improve the subjective picture image quality, in accordance with an embodiment of the disclosure.

The EBC circuitry 108 may be further configured to determine a number of refinement bits from the total refinement bits available for allocation in the plurality of encoded data blocks. The number of refinement bits to be allocated in each encoded data block may be determined based on the visual quality measure of each encoded data block. For example, the number of refinement bits may be lesser for the highly textured area as compared to the low textured area for optimal utilization of the available refinement bits. The EBC circuitry 108 may be further configured to allocate the determined number of refinement bits at the un-coded bit-positions in the plurality of bit-planes for each encoded data block.

In accordance with another embodiment, an EBC decoder circuit (not shown in FIG. 1) of the EBC circuitry 108 may pre-store different coding tables (e.g., custom coding tables for Huffman encoding schemes, Exponential-Golomb encoding schemes, or signaling bit tables) and quantization tables. Therefore, the bit-stream of encoded image block may need not include different coding tables and quantization tables.

In accordance with an embodiment, the EBC circuitry 108 may be configured to generate the bit-stream of encoded image block such that the bit-stream may be decodable by different external decoders that may utilize different decoding schemes to decode the bit-stream of encoded image block. In such a case, the EBC circuitry 108 may be configured to add different coding tables (e.g., custom coding tables for Huffman encoding schemes, Exponential-Golomb encoding schemes, or signaling bit tables) and quantization tables, in header information or a different meta-stream associated with the bit-stream of encoded image block. By addition of such custom tables and quantization tables in the bit-stream, the output of the EBC circuitry 108 may be decodable by other decoder circuitries.

In accordance with an embodiment, the bit-stream of encoded image block may be stored as part of an input image (such as a 2D image), a complete image, or a video portion, in the memory, such as the external memory 110 or an on-chip memory in the EBC circuitry 108. In one implementation, the processor 106 may be configured to transfer the bit-stream of encoded image block, via the system bus 112, to a frame buffer (or a frame store) of a display circuitry (e.g., a video card) communicatively interfaced with the system bus 112 of the media device 102. The frame buffer may act as a compressed frame buffer for the display circuitry. The display circuitry (not shown in FIG. 1) may decode and further utilize the bit-stream of encoded bit-stream of image block to display a patch of image at the media device 102. In another implementation, the processor 106 may be configured to transfer the bit-stream of encoded image block, via the system bus 112, to a decoder buffer, such as a decoder picture buffer (DPB) of a video decoder, a buffer memory for an image decoder, or a coded picture buffer (CPB) of a video codec, in the media device 102.

In an exemplary implementation, the media device 102 may be a camera, such as a digital video camera or a digital image camera, and the bit-stream of encoded image block may correspond to a 1D array of pixel values that are directly received from a read-out register of a CMOS sensor in the camera. In an exemplary embodiment, the EBC circuitry 108 may be implemented in the CMOS sensor circuitry.

FIG. 2 is a block diagram that illustrates an embedded codec (EBC) circuitry with various peripheral components for visual quality based allocation of refinement bits, in accordance with an embodiment of the disclosure. FIG. 2 is explained in conjunction with elements from FIG. 1. With reference to FIG. 2, there is shown a block diagram 200 of the EBC circuitry 108. The EBC circuitry 108 may include an Input/output (I/O) interface 202, an on-chip memory 204, an encoder circuitry 206, and a decoder circuitry 208. In the block diagram 200, there is also shown the image sensor 104, the processor 106, and the external memory 110 communicatively coupled to the EBC circuitry 108, via the system bus 112. In some embodiments, the processor 106 and the external memory 110 may be implemented inside the EBC circuitry 108, without a deviation from the scope of the disclosure.

The I/O interface 202 may comprise suitable logic, circuitry, and interfaces that may be configured to manage a plurality of I/O ports to facilitate exchange of communication data from other peripheral circuitries, via the system bus 112, for example, the external memory 110, the processor 106, or the image sensor 104. The communication data may include a bit-stream of the encoded image block, control signals, CPU instructions, and the like. The configuration of the I/O ports may depend on a specification of the EBC circuitry 108, for example, physical I/O pins in an ASIC, FPGA or a SoC chip.

The on-chip memory 204 may comprise suitable logic, circuitry, and interfaces that may be configured to store different operational data (e.g., residual levels, quantization levels, entropy coded bits, etc.) that may be utilized by different components of the EBC circuitry 108 to encode the image block. Examples of the operational data stored in the on-chip memory 204 may include, but are not limited to, a bit-stream of encoded image block, quantized levels, quantized residual levels, computed variables, and temporary processing data, and 1D/2D image blocks. The on-chip memory 204 may be implemented as a specific memory designed with a defined memory specification, such as a read/write speed, a memory size, fabrication factors, and the like. Examples of the on-chip memory 204 may include, but are not limited to, static random access memory (SRAM), dynamic access memory (DRAM), and Static Dynamic RAM (SD-RAM).

The encoder circuitry 206 may comprise suitable logic, circuitry, and interfaces that may be configured to generate a bit-stream of encoded image block by application of a sequential encoding scheme on an image block and followed by refinement of the encoded image block. The encoder circuitry 206 may also determine a number of refinement bits to be allocated in each encoded data block. The encoder circuitry 206 may allocate refinement bits to the encoded sub-blocks based on the visual quality measure of the encoded sub-blocks. The sub-blocks with lower visual quality measure may be allocated with a greater number of refinement bits as compared to the sub-blocks with higher visual quality measure, which improves the overall subjective image quality as coding artifacts may not be visible in the sub-blocks with lower visual quality measure. In some embodiments, the encoder circuitry 206 may be a hardware encoder chip that may be implemented based on one of ASIC, programmable logic devices (PLDs), SOC, FPGA, digital signal processors (DSPs) or other specialized circuitries. In other embodiments, the encoder circuitry 206 may be implemented as a combination of hardware and stored set of instructions in the on-chip memory 204 (for example, instructions based on VHDL or HDL logic).

The decoder circuitry 208 may comprise suitable logic, circuitry, and interfaces that may be configured to decode a bit-stream of encoded image block based on header information that includes a set of signaling bits allocated to each sub-block of the plurality of sub-blocks (associated with an encoded image block). In some embodiments, the decoder circuitry 208 may have pre-stored quantization tables and coding tables that may act as a reference for the decoder circuitry 208 to decode the bit-stream of encoded image block. In some embodiments, the decoder circuitry 208 may be a hardware encoder chip that may be implemented based on one of ASIC, programmable logic devices (PLDs), SOC, FPGA, digital signal processors (DSPs) or other specialized circuitries. In some embodiments, the decoder circuitry 208 may be implemented as a combination of hardware and programmed instructions in the on-chip memory 204 (for example, instructions based on VHDL or HDL logic).

In operation, a plurality of sub-blocks of quantized residual levels of an image block may be stored in the memory, such as the external memory 110 or the on-chip memory 204. Prior to storage, the plurality of sub-blocks of quantized residual levels may be generated based on a sequential application of a quantization (i.e., bit-plane quantization scheme) followed by a residual prediction (DPCM scheme) for a plurality of image sub-blocks of the image block. For example, in a "16×1" image block, there may be four "4×1" image sub-blocks. The encoder circuitry 206 may be configured to generate four "4×1" sub-blocks of quantized residual levels, based on a sequential application of a bit-plane quantization for a quantization parameter of "7" on each "4×1" sub-block, and a DPCM coding scheme in each "4×1" sub-block of four "4×1" sub-blocks.

Different sub-blocks in the plurality of sub-blocks of quantized residual levels may have a different level of complexity (or level of flatness). The level of complexity or flatness may correspond to difference in consecutive pixel values in a sub-block. For example, a sub-block in which there is large variation in pixel values may be considered as a complex sub-block, whereas a sub-block in which pixel values are relatively similar may be considered as an easy sub-block. The easy sub-block may comprise redundant pixel value which can be represented using a lesser number of bits as compared to the complex sub-block where each pixel value has a significant effect on the resultant output image.

In order to entropy encode the plurality of sub-blocks of quantized residual levels, the encoder circuitry 206 may be configured to retrieve the stored plurality of sub-blocks of quantized residual levels from the memory, such as the external memory 110 or the on-chip memory 204. The encoder circuitry 206 may be further configured to execute an entropy coding scheme on the plurality of sub-blocks of quantized residual levels. Examples of the entropy coding scheme may be, but is not limited to, a Huffman coding scheme, an exponential Golomb coding scheme, a progressive Golomb coding scheme, a Golomb-Rice coding scheme, or a combination of the Huffman coding scheme and the exponential Golomb coding scheme. The execution of the entropy coding scheme may result in the generation of the plurality of encoded sub-blocks, which include entropy coded bits in a plurality of bit-planes. Due to compression, some of the bit-positions may be available for refinement in the plurality of bit-planes. The number of entropy coded bits in each encoded sub-block depends on the complexity level of the sub-block. The complex sub-block may be encoded with a greater number of bits as compared to the easy sub-block.

In certain embodiments, a number and a sequence of encoding operations, such as pre-processing, quantization, residual prediction, entropy coding, and post-processing, that may be applied on the image block may vary as per application specific requirements. In some implementation, a sequential encoding scheme may include sequential application of transform coding, quantization, residual prediction, and entropy coding. However, any other sequential encoding scheme may also be applied without a deviation from the scope of the disclosure.

The encoder circuitry 206 may be configured to determine a visual quality measure for the plurality of encoded sub-blocks. The visual quality measure may be indicative of visual error tolerant capability of the plurality of encoded sub-blocks. The visual quality measure may be equal to, but is not limited to, a number of entropy coded bits in each encoded sub-block. Based on the desired hardware complexity, other visual quality measures may be determined that may reflect a texture, brightness, color or a combination of these.

In accordance with an embodiment, the encoder circuitry 206 may be configured to compute a total number of refinement bits that may be allocated in the plurality of encoded sub-blocks, based on a bit-depth of the plurality of encoded sub-blocks and a total number of entropy coded bits in the plurality of encoded sub-blocks. The bit-depth may be equal to the number of bit-planes in the plurality of encoded sub-blocks. The bit-depth may be specified prior to compression, based on a user input. In another embodiment, the encoder circuitry 206 may be configured to acquire the total number of refinement bits to be allocated in the plurality of encoded sub-blocks, based on the user input.

The encoder circuitry 206 may be configured to determine a maximum number of refinement bits that may be allocated in each encoded sub-block. The maximum number of refinement bits may be determined based on a size of the encoded sub-block (for example, '4' for a "4×1" sub-block) and a number of bit-planes that include vacant bit-positions. For example, the maximum number of refinement bits, for a "4×1" encoded sub-block with '8' vacant bit-planes, may be determined as 32 (8×4=32) refinement bits.

In accordance with an embodiment, the encoder circuitry 206 may be further configured to determine whether the plurality of encoded sub-blocks satisfy a worst quality limit (WQL) or not. The WQL may also be referred to as the worst quality measure. The worst quality measure (i.e., the WQL) may be a threshold number of bit-planes up to which each encoded sub-block need to contain the entropy coded bits. In a case where the plurality of encoded sub-blocks do not satisfy the WQL, the encoder circuitry 206 may be further configured to allocate refinement bits from the total number of refinement bits in the plurality of encoded sub-blocks to fill the threshold number of bit-planes. For example, if the WQL is '3', then the encoder circuitry allocates the refinement bits up to 3 most significant bit-planes in each encoded sub-block. The encoder circuitry 206 may be further configured to update the total number of refinement bits and the maximum number of refinement bits to be allocated in each encoded sub-block, in the case the refinement bits are allocated to fill the threshold number of bit-planes.

In accordance with an embodiment, the encoder circuitry 206 may be configured to determine a number of refinement bits of the total number of refinement bits for each encoded sub-block based on the visual quality measure of the plurality of encoded sub-blocks. The number of refinement bits for an encoded sub-block with high visual quality (a greater number of entropy coded bits) is lower than the number of refinement bits for an encoded sub-block with low visual quality (a smaller number of entropy coded bits).

In accordance with an embodiment, the encoder circuitry 206 may be configured to set the number of entropy coded bits in each encoded sub-block as a first reference level. The encoder circuitry 206 may be configured to determine whether allocation of the refinement bits up to the first reference level in remaining encoded sub-blocks may exceed the total count of refinement bits or not. In case the allocation of the refinement bits up to the first reference level in remaining encoded sub-blocks exceeds the total count of refinement bits, the encoder circuitry 206 may be configured to determine the number of refinement bits for that encoded sub-block as '0'. Otherwise, the encoder circuitry 206 may be configured to determine the number of refinement bits for that encoded sub-block based on a second reference value.

The encoder circuitry 206 may be further configured to set a sum of the number of entropy coded bits in each encoded sub-block and the maximum count of refinement bits as a second reference level. The encoder circuitry 206 may be configured to determine whether allocation of the refinement bits up to the second reference level in remaining encoded sub-blocks may exceed the total count of refinement bits or not. In case the allocation of the refinement bits up to the second reference level in remaining encoded sub-blocks does not exceed the total count of refinement bits, the encoder circuitry 206 may be configured to determine the number of refinement bits for that encoded sub-block as the maximum count of refinement bits. Otherwise, the encoder circuitry 206 may be configured to list that encoded sub-block for further determination of the number of refinements bits. The encoder circuitry 206 may be configured to determine the number of refinements bits for the listed encoded sub-blocks such that a number of bits (entropy coded bits and the refinement bits) is equal in all of the listed encoded sub-blocks.

In accordance with an embodiment, in order to determine whether allocation of the refinement bits up to the first reference level or the second reference level in remaining encoded sub-blocks may exceed the total count of refinement bits, the encoder circuitry 206 may be further configured to compute an objective function for each encoded sub-block. The objective function may be defined as a difference of the total number of refinement bits and a sum of difference between the reference level and the number of entropy coded bits in a particular encoded sub-block. The difference between the reference level and the number of entropy coded bits is limited to the maximum count of refinement of bits. The objective function may be computed as shown by equation (1) as follows:

$$F_i(M_i) = TR - \sum_{j=0}^{N} M_i - M_j \quad (1)$$

where the "$F_i$" represents an objective function value for $i^{th}$ encoded sub-block, "TR" represents the total number of refinement bits, M represents the visual quality measure (number of entropy coded bits), and "N" represents the number of encoded sub-blocks. The $M_i-M_j$ may be limited by the equation (2) as follows:

$$M_i - M_j = \begin{cases} 0, & M_i - M_j \leq 0 \\ M_i - M_j, & 0 < M_i - M_j < \text{Limit} \\ \text{Limit}, & M_i - M_j \geq \text{Limit} \end{cases} \quad (2)$$

where "Limit" represents the maximum count of refinement bits.

The encoder circuitry 206 may be further configured to determine signs of the objective function for the first reference level and the second reference level for an encoded sub-block. In a scenario, in which the signs of the objective function for the first reference level and the second reference level are determined as positive, the encoder circuitry 206 may be configured to determine the number of the refinement bits for the encoded sub-block as the maximum count of refinement bits. In other words, the allocation of the refinement bits up to the first reference level or the second reference level in remaining encoded sub-blocks will not exceed the total count of refinement bits. In another scenario, in which the signs of the objective function for the first reference level and the second reference level are determined as negative, the encoder circuitry 206 may be configured to determine the number of the refinement bits for the encoded sub-block as '0'. In other words, the allocation of the refinement bits up to the first reference level or the second reference level in remaining encoded sub-blocks will exceed the total count of refinement bits. In a scenario, in which the signs of the objective function for the first reference level and the second reference level are determined as positive and negative respectively, the encoder circuitry 206 may be configured to list the encoded sub-block for further determination of number of refinement bits. This is illustrated in Table (1) as follows:

TABLE 1

| $F_i(M_i)$ | $F_i(M_i + \text{Limit})$ | Number of Refinement Bits |
|---|---|---|
| + | + | Limit |
| + | − | List |
| − | + | 0 |
| − | − | 0 |

The encoder circuitry 206 may be further configured to determine the number of refinement bits for the encoded sub-blocks listed above. The number of refinement bits may be determined for the listed encoded sub-blocks such that the distribution of bits (both the entropy coded bits and the refinement bits) may be uniform in each encoded sub-block which is listed. In order to distribute the refinement bits uniformly, the encoder circuitry 206 may be configured to first determine the number of refinement bits such that all of the listed encoded sub-blocks include the bits up to a maximum number of bits in the listed encoded sub-blocks. Then, the encoder circuitry 206 may be configured to increment the number of refinement bits one by one in each of the listed encoded sub-blocks such that the number of bits are equal in the listed encoded sub-blocks.

The encoder circuitry 206 may be further configured to allocate the determined number of refinement bits in each encoded sub-block independently. The allocation of the refinement bits in different encoded sub-blocks may occur simultaneously, which improves latency of the encoder circuitry as the encoded sub-blocks are processed in parallel. The latency may depend on the sub-block size as the sub-block size with lower size will have provide high latency. The allocation of the refinement bits may be done in a defined refinement order, which may include, but is not limited to, boundary to center refinement order. In some implementations, the refinement order may be a left to right refinement order.

In certain embodiments, the encoder circuitry 206 may be configured to determine the number of refinement bits for each pixel of a plurality of pixels in the image block. In other words, the sub-block size is limited to '1' pixel per sub-block. The pixel-based allocation of refinement bits may increase the hardware complexity, but the subjective image quality may also increase as compared to the sub-block based allocation of refinement bits. The pixel-based allocation of refinement bits may further increase the latency of the encoder circuitry 206 as the plurality of pixels are processed in parallel. Thus, the choice of the pixel-based or the sub-block based allocation of refinement bits may depend on desired requirements of image quality, hardware complexity, or latency requirement.

As an example, a "16×1" image block may be partitioned into four "4×1" sub-blocks (S1, S2, S3, and S4). The encoder circuitry 206 may execute the entropy coding scheme on the sub-blocks (S1, S2, S3, and S4) to generate encoded sub-blocks (E1, E2, E3, and E4) with a bit-depth of '16'. The bit-depth specifies a total number of bit-planes in the encoded sub-blocks. The most significant 8 bit-planes may include the entropy coded bits and the least significant 8 bit-planes may include vacant bit-positions where the refinement bits may be allocated.

The encoder circuitry 206 may determine the visual quality measure for the encoded sub-blocks (E1, E2, E3, and E4) as a count of entropy coded bits in each of the encoded sub-blocks. The visual quality measure may be determined as M=[90 20 50 60], where 90, 20, 50, and 60 represents the number of entropy coded bits in E1, E2, E3, and E4 respectively.

The encoder circuitry 206 may determine the maximum number of refinement bits that may be allocated in each of the encoded sub-blocks E1, E2, E3, and E4. The maximum number of refinement bits may be determined as multiplication of the sub-block size (4) and the number of vacant bit-planes (8) i.e., "8×4=32" refinement bits. The maximum number of refinement bits may be represented as "Limit".

In a first scenario, the total number of refinement bits, for example, may be '100'. The encoder circuitry 206 may compute the objective function value for each of the encoded sub-blocks E1, E2, E3, and E4 for two input values (first and second reference levels). The first input value may be $M_i$ and the second input value may be $M_i$+Limit.

For encoded sub-block E1 and the first input value as $M_i$=90, the objective function may be computed based on the equation (1) as follows:

$$F_1(90)=100-\{(90-90)+(90-20)+(90-50)+(90-60)\},$$

where the difference Mi−Mj is governed by the equation (2). Thus, $$F_1(90)=100-\{0+32+32+30\}=6 \text{ (positive)}.$$

For the second input value as $M_i$+Limit=122, the objective function may be computed based on the equation (1) as follows:

$$F_1(122)=100-\{(122-90)+(122-20)+(122-50)+(122-60)\},$$

where the difference Mi−Mj is governed by the equation (2). Thus, $$F_1(122)=100-\{32+32+32+32\}=-28 \text{ (negative)}.$$

Referring to Table 1, as signs are positive and negative, the encoder circuitry 206 may list encoded sub-block E1 for further determination of number of refinement bits R1. The "List"={E1} may be further processed for determination of the number of refinement bits R1 for the listed encoded sub-block E1.

For encoded sub-block E2 and the first input value as $M_i$=20, the objective function may be computed based on the equation (1) as follows:

$$F_2(20)=100-\{(20-90)+(20-20)+(20-50)+(20-60)\},$$

where the difference Mi−Mj is governed by the equation (2). Thus, $$F_2(20)=100-\{0+0+0+0\}=100 \text{ (positive)}.$$

For the second input value as $M_i$+Limit=52, the objective function may be computed based on the equation (1) as follows:

$$F_2(52)=100-\{(52-90)+(52-20)+(52-50)+(52-60)\},$$

where the difference Mi−Mj is governed by the equation (2). Thus, $$F_2(52)=100-\{0+32+2+0\}=66 \text{ (positive)}.$$

Referring to Table 1, as the signs are both positive, the encoder circuitry 206 may determine the number of refinement bits R2 for the encoded sub-block E2 as limit i.e., 32.

For encoded sub-block E3 and the first input value as $M_i$=50, the objective function may be computed based on the equation (1) as follows:

$$F_3(50)=100-\{(50-90)+(50-20)+(50-50)+(50-60)\},$$

where the difference Mi−Mj is governed by the equation (2). Thus, $$F_3(50)=100-\{0+30+0+0\}=70 \text{ (positive)}.$$

For the second input value as $M_i$+Limit=82, the objective function may be computed based on the equation (1) as follows:

$$F_3(82)=100-\{(82-90)+(82-20)+(82-50)+(82-60)\},$$

where the difference Mi−Mj is governed by the equation (2). Thus, $$F_3(82)=100-\{0+32+32+22\}=14 \text{ (positive)}.$$

Referring to Table 1, as the signs are both positive, the encoder circuitry 206 may determine the number of refinement bits R3 for the encoded sub-block E3 as limit i.e., 32.

For encoded sub-block E4 and the first input value as $M_i$=60, the objective function may be computed based on the equation (1) as follows:

$$F_4(60)=100-\{(60-90)+(60-20)+(60-50)+(60-60)\},$$

where the difference Mi−Mj is governed by the equation (2). Thus, $$F_4(60)=100-\{0+32+10+0\}=58 \text{ (positive)}.$$

For the second input value as $M_i$+Limit=92, the objective function may be computed based on the equation (1) as follows:

$$F_4(92)=100-\{(92-90)+(92-20)+(92-50)+(92-60)\},$$

where the difference Mi−Mj is governed by the equation (2). Thus, $$F_4(92)=100-\{2+32+32+32\}=2 \text{ (positive)}.$$

Referring to Table 1, as the signs are both positive, the encoder circuitry 206 may determine the number of refinement bits R4 for the encoded sub-block "E4 as limit i.e., 32.

As the number of refinement bits R1 are still remaining to be determined, the encoder circuitry 206 may determine the remaining refinement bits of the total number of refinement bits after determination of the R2, R3, and R4. The remaining refinement bits may be determined as "100−(32+32+32)" i.e., 4 refinement bits. The encoder circuitry 206 may determine the number of refinement bits R1 for encoded sub-block E1 as '4'. Here, the list include only one encoded sub-block, thus the remaining refinement bits as determined as the number of refinement bits.

In a second scenario, the total number of refinement bits, for example, may be '50'. The encoder circuitry 206 may compute the objective function value for each of the encoded sub-blocks E1, E2, E3, and E4 for two input values (first and second reference levels). The first input value may be $M_i$ and the second input value may be $M_i$+Limit.

For encoded sub-block E1 and the first input value as $M_i$=90, the objective function may be computed based on the equation (1) as follows:

$$F_1(90)=50-\{(90-90)+(90-20)+(90-50)+(90-60)\},$$

where the difference Mi−Mj is governed by the equation (2). Thus, $$F_1(90)=50-\{0+32+32+30\}=-44 \text{ (negative)}.$$

For the second input value as $M_i$+Limit=122, the objective function may be computed based on the equation (1) as follows:

$$F_1(122)=50-\{(122-90)+(122-20)+(122-50)+(122-60)\},$$

where the difference Mi−Mj is governed by the equation (2). Thus, $$F_1(122)=50-\{32+32+32+32\}=-78 \text{ (negative)}.$$

Referring to Table 1, as the signs are both negative, the encoder circuitry 206 may determine number of refinement bits R1 for encoded sub-block E1 as '0'.

For encoded sub-block E2 and the first input value as $M_i$=20, the objective function may be computed based on the equation (1) as follows:

$$F_2(20)=50-\{(20-90)+(20-20)+(20-50)+(20-60)\},$$

where the difference Mi−Mj is governed by the equation (2). Thus, $$F_2(20)=50-\{0+0+0+0\}=50 \text{ (positive)}.$$

For the second input value as $M_i$+Limit=52, the objective function may be computed based on the equation (1) as follows:

$$F_2(52)=50-\{(52-90)+(52-20)+(52-50)+(52-60)\},$$

where the difference Mi−Mj is governed by the equation (2). Thus, $$F_2(52)=50-\{0+32+2+0\}=16 \text{ (positive)}.$$

Referring to Table 1, as the signs are both positive, the encoder circuitry 206 may determine the number of refinement bits R2 for the encoded sub-block E2 as limit i.e., 32.

For encoded sub-block E3 and the first input value as $M_i$=50, the objective function may be computed based on the equation (1) as follows:

$$F_3(50)=50-\{(50-90)+(50-20)+(50-50)+(50-60)\},$$

where the difference Mi−Mj is governed by the equation (2). Thus, $$F_3(50)=50-\{0+30+0+0\}=20 \text{ (positive)}.$$

For the second input value as $M_i$+Limit=82, the objective function may be computed based on the equation (1) as follows:

$$F_3(82)=50-\{(82-90)+(82-20)+(82-50)+(82-60)\},$$

where the difference Mi−Mj is governed by the equation (2). Thus, $$F_3(82)=50-\{0+32+32+22\}=-36 \text{ (negative)}.$$

Referring to Table 1, as the signs are positive and negative respectively, the encoder circuitry 206 may list the encoded sub-block E3 for further determination of the number of refinement bits R3. The "List"={E3} may be further processed for determination of the number of refinement bits R3 for the listed encoded sub-block E3.

For encoded sub-block E4 and the first input value as $M_i$=60, the objective function may be computed based on the equation (1) as follows:

$$F_4(60)=50-\{(60-90)+(60-20)+(60-50)+(60-60)\},$$

where the difference Mi−Mj is governed by the equation (2). Thus, $$F_4(60)=50-\{0+32+10+0\}=8 \text{ (positive)}.$$

For the second input value as $M_i$+Limit=92, the objective function may be computed based on the equation (1) as follows:

$$F_4(92)=50-\{(92-90)+(92-20)+(92-50)+(92-60)\},$$

where the difference Mi−Mj is governed by the equation (2). Thus, $$F_4(92)=50-\{2+32+32+32\}=-48 \text{ (negative)}.$$

Referring to Table 1, as the signs are positive and negative respectively, the encoder circuitry 206 may list the encoded sub-block E4 for further determination of the number of refinement bits R4. The "List"={E3, E4} may be further processed for determination of the number of refinement bits R3 and R4 for the listed encoded sub-blocks E3 and E4.

As the number of refinement bits R3 and R4 are still remaining to be determined, the encoder circuitry 206 may determine the remaining refinement bits of the total number of refinement bits after determination of the R1, and R2. The remaining refinement bits may be determined as "50−(0+32)" i.e., 18 refinement bits. Here, the "list" include two encoded sub-blocks E3 and E4, thus the encoder circuitry 206 may determine the number of refinement bits R3 and R4 from the remaining refinement bits (i.e., 18). The encoder circuitry 206 may determine the maximum number of entropy coded bits in the listed encoded sub-blocks E3 and E4 (or maximum of $M_3$ or $M_4$). As encoded sub-block E4 has maximum entropy coded bits (i.e., $M_4$=60), the encoder circuitry 206 may first determine R3 as difference of $M_3$ and $M_4$ (i.e., 60−50=10 refinement bits). As the remaining refinement bits are still available for allocation (i.e., 18−10=8 refinement bits), the encoder circuitry 206 may increment R3 and determine R4 such that these 8 refinement bits are equally distributed between E3 and E4 (4 refinement bits in each of the E3 and E4). Thus, the R3 may be determined as (10+4) 14 refinement bits and R4 may be determined as 4 refinement bits.

In conventional refinement techniques, the refinement bits may be allocated sequentially in each encoded sub-block of the plurality of encoded sub-blocks starting from a higher bit-plane to a lower bit-plane, until the entire bit-budget is utilized. In cases where, the encoded sub-blocks may have different visual error tolerance, an encoded sub-block with lower visual error tolerance may be more prone to visible coding artifacts. In such cases, the allocation of the same number of refinement bits in each encoded sub-block may degrade the subjective image quality. For example, '16' refinement bits may be allocated as '4' refinement bits in each of the four sub-blocks. This may not be optimal utilization of these refinement bits as a sub-block (with high visual error tolerance) may be allocated with the same number of refinement bits as another sub-block (with low visual error tolerance). Thus, the allocation of refinement bits, in accordance with an embodiment of the disclosure, may ensure the optimal utilization of the refinement bits by allocating a greater number of refinement bits to the sub-block (with low visual error tolerance) as compared to the sub-block (with high visual error tolerance). Such allocation of refinement bits significantly improves compression efficiency without an adverse impact on quality of encoded image. Further, the subjective image quality is also improved by allocation of a greater number of refinement bits to low visual error tolerance. Furthermore, the allocation of the refinement bits independently in each encoded sub-block significantly improves the latency of the encoder circuitry.

FIG. 3 illustrates allocation of refinement bits, by the EBC circuitry of FIG. 2, in accordance with an embodiment of the disclosure. FIG. 3 is explained in conjunction with elements from FIG. 1 and FIG. 2. With reference to FIG. 3, there is shown a diagram 300. The diagram 300 describes certain operations executed by the encoder circuitry 206 while refining a plurality of encoded sub-blocks obtained after a sequential application of quantization, and a residual prediction on an image block (partitioned into a plurality of image sub-blocks) and followed by an entropy coding scheme.

There is shown a plurality of encoded sub-blocks 302, such as an encoded sub-block 302A, an encoded sub-block 302B, and an encoded sub-block 302C. The plurality of encoded sub-blocks 302 comprises a plurality of entropy coded bits 304 in a first plurality of bit-planes $BP_1$, $BP_2$, $BP_3$, and $BR_4$, and un-coded bits 306 in a second plurality of bit-planes $BP_5$, $BP_6$, $BP_7$, and $BP_8$. The bit-plane $BP_1$ is a most significant bit-plane (MSB) and the bit-plane $BP_8$ is a least significant bit-plane (LSB).

At preprocessing 308, the encoder circuitry 206 may be configured to determine whether the plurality of encoded sub-blocks 302 satisfy a worst quality limit (WQL). Here, the WQL is considered as '4', which is equal to 4 most significant bit-planes. As the plurality of encoded sub-blocks 302 are not completely filled with the plurality of entropy coded bits up to 4 most significant bit-planes $BP_1$, $BP_2$, $BP_3$, and $BR_4$, the encoder circuitry 206 may be configured to first allocate refinement bits up to 4 most significant bit-planes $BP_1$, $BP_2$, $BP_3$, and $BR_4$ to satisfy the WQL.

At refinement budget allocation 310, the encoder circuitry 206 may be configured to determine a count of refinement bits for each of the encoded sub-blocks 302A, 302B, and 302C, based on a visual quality measure of each of the encoded sub-blocks 302A, 302B, and 302C. The visual quality measure may be equal to a count of entropy coded bits in each of the encoded sub-blocks 302A, 302B, and 302C. As the encoded sub-block 302A has a minimum count of entropy coded bits, the count of refinement bits for the encoded sub-block 302A may be determined as a maximum among the count of refinement bits for the encoded sub-blocks 302A, 302B, and 302C. As the encoded sub-block 302B has a maximum count of entropy coded bits, the count of refinement bits for the encoded sub-block 302A may be determined as a minimum (i.e., '0') among the count of refinement bits for the encoded sub-blocks 302A, 302B, and 302C.

At refinement bits allocation 312, the encoder circuitry 206 may be configured to allocate the determined count of refinement bits in each of the encoded sub-blocks 302A, 302B, and 302C in accordance with a refinement order 314. The allocation of refinement bits may start from a most significant bit-plane of the second plurality of bit-planes (i.e., $BP_5$), and proceed to next bit-plane until the determined count of refinement may be allocated in the encoded sub-blocks 302A and 302C. The refinement order 314 may be a boundary to center order, in which the refinement bits may be allocated at bit-positions that are at extreme positions in the encoded sub-block and proceed towards the center bit-position. Although not shown, in a case of pixel-based refinement, the sub-block size may be equal to '1', and the refinement order 314 may be MSB to LSB.

FIGS. 4A, 4B, and 4C, collectively, depicts a flowchart that illustrates an exemplary method for visual quality based allocation of refinement bits, in accordance with an embodiment of the disclosure. FIGS. 4A, 4B, and 4C are explained in conjunction with elements from FIGS. 1, 2, and 3. With reference to FIGS. 4A, 4B, and 4C, there is shown a flowchart 400 implemented in the EBC circuitry 108. The method starts at 402 and proceeds to 404.

At 404, an image block may be partitioned into a plurality of image sub-blocks. Each image sub-block may comprise at least one pixel value of a plurality of pixel values in the image block. The encoder circuitry 206 may be configured to partition the image block, for example, a "16×1" image block, into a plurality of image sub-blocks.

At 406, a sequential application of a quantization, followed by a residual prediction may be executed on the plurality of image sub-blocks to generate a plurality of sub-blocks of quantized residual levels. The encoder circuitry 206 may be configured to execute a sequential application of a quantization, followed by a residual prediction on the plurality of image sub-blocks to generate a plurality of sub-blocks of quantized residual levels.

At 408, a plurality of encoded sub-blocks may be generated by an application of an entropy coding scheme on the plurality of sub-blocks of quantized residual levels. The plurality of encoded sub-blocks may comprise a plurality of entropy coded bits in a first plurality of bit-planes and un-coded bit-positions in a second plurality of bit-planes. The encoder circuitry 206 may be configured to generate a plurality of encoded sub-blocks by the application of the entropy coding scheme on the plurality of sub-blocks of quantized residual levels.

At 410, a visual quality measure may be determined for each encoded sub-block based on a count of entropy coded bits in each encoded sub-block. The encoder circuitry 206 may be configured to determine the visual quality measure for each encoded sub-block based on the count of entropy coded bits in each encoded sub-block.

At 412, a total count of refinement bits may be determined based on a defined bit-depth and a total count of the plurality of entropy coded bits in the plurality of encoded sub-blocks. The defined bit-depth may be equal to a sum of the first and the second plurality of bit-planes. The encoder circuitry 206 may be configured to determine the total count of refinement bits based on the defined bit-depth and a total count of the plurality of entropy coded bits in the plurality of encoded sub-blocks.

At 414, a maximum count of refinement bits may be determined for the plurality of encoded sub-blocks based on a sub-block size of the plurality of encoded sub-blocks and a count of the second plurality of bit-planes. The encoder circuitry 206 may be configured to determine a maximum count of refinement for the plurality of encoded sub-blocks based on a sub-block size of the plurality of encoded sub-blocks and a count of the second plurality of bit-planes.

At 416, it may be determined whether the plurality of encoded sub-blocks satisfy a worst quality limit (WQL). The encoder circuitry 206 may be configured to determine whether any the plurality of encoded sub-blocks satisfy the worst quality limit (WQL). In cases where the plurality of encoded sub-blocks satisfy the worst quality limit (WQL), then the control passes to 422, or else the control passes to 418.

At 418, refinement bits of the total count of refinement bits may be allocated in the plurality of encoded sub-blocks such that the WQL is satisfied. The encoder circuitry 206 may be configured to allocate refinement bits of the total count of refinement bits in the plurality of encoded sub-blocks such that the WQL is satisfied.

At 420, the total count of refinement bits and the maximum count of refinement bits may be updated. The encoder circuitry 206 may be configured to update the total count of refinement bits and the maximum count of refinement bits.

At 422, an objective function value may be determined for each encoded sub-block for a first reference value. The first reference value may be equal to a count of entropy coded bits in a corresponding encoded sub-block. The objective function value may be defined as a difference of the total count of refinement bits and a sum of difference between the first reference level and the number of entropy coded bits in an encoded sub-block. The encoder circuitry 206 may be configured to determine the objective function value for each encoded sub-block for the first reference value.

At 424, it may be determined whether the objective function value for the first reference value is greater than zero. The encoder circuitry 206 may be configured to determine whether the objective function value for the first reference value is greater than zero. In cases where the objective function value for the first reference value is greater than zero, then the control passes to 426, or else the control passes to 428.

At 426, an objective function value may be determined for an encoded sub-block for a second reference value. The second reference value may be equal to a sum of the count of entropy coded bits in a corresponding encoded sub-block and the maximum count of refinement bits. The objective function value may be defined as a difference of the total count of refinement bits and a sum of difference between the second reference level and the number of entropy coded bits in the encoded sub-block. The encoder circuitry 206 may be configured to determine the objective function value for the encoded sub-block for the second reference value.

At 428, a count of refinement bits for an encoded sub-block may be determined as '0'. The encoder circuitry 206 may be configured to determine the count of refinement bits for the encoded sub-block as '0'.

At 430, it may be determined whether the objective function value for the second reference value is greater than zero. The encoder circuitry 206 may be configured to determine whether the objective function value for the second reference value is greater than zero. In cases where the objective function value for the second reference value is greater than zero, then the control passes to 432, or else the control passes to 434.

At 432, the count of refinement bits for the encoded sub-block may be determined as the maximum count of refinement bits. The encoder circuitry 206 may be configured to determine the count of refinement bits for the encoded sub-block as the maximum count of refinement bits.

At 434, the encoded sub-block may be selected for further determination of the count of refinement bits. The encoder circuitry 206 may be configured to select the encoded sub-block for further determination of the count of refinement bits.

At 436, a remaining count of refinement bits may be determined from the total count of refinement bits. The encoder circuitry 206 may be configured to determine the remaining count of refinement bits from the total count of refinement bits.

At 438, the count of refinement bits may be determined for the selected encoded sub-blocks such that the entropy coded bits and the refinement bits are uniformly distributed in the selected encoded sub-blocks. The encoder circuitry 206 may be configured to determine the count of refinement bits for the selected encoded sub-blocks such that the entropy coded bits and the refinement bits are uniformly distributed in the selected encoded sub-blocks.

At 440, the determined count of refinement bits may be allocated in the second plurality of bit-planes of corresponding encoded sub-block. The encoder circuitry 206 may be configured to allocate the determined count of refinement bits in the second plurality of bit-planes of corresponding encoded sub-block. The control may pass to end.

Certain embodiments of the disclosure may be found in an embedded codec (EBC) circuitry (e.g., the EBC circuitry 108 (FIG. 1)). Various embodiments of the disclosure may provide the EBC circuitry that may include an encoder circuitry (e.g., the encoder circuitry 206 (FIG. 2)). The encoder circuitry may be configured to encode a plurality of sub-blocks of an image block by an entropy coding scheme to generate a plurality of encoded data blocks. Each encoded data block of the plurality of encoded data blocks may comprise a first plurality of bit-planes and a second plurality of bit-planes. The first plurality of bit-planes may comprise a plurality of entropy coded bits. The encoder circuitry may be further configured to determine a first count of refinement bits of a plurality of refinement bits, for a first encoded data block of the plurality of encoded data blocks, based on a quality measure of the plurality of encoded data blocks. The quality measure may represent a first count of the plurality of entropy coded bits in each encoded data block of the plurality of encoded data blocks. The encoder circuitry may be further configured to allocate the first count of refinement bits in the second plurality of bit-planes of the first encoded data block.

In accordance with an embodiment, the encoder circuitry may be further configured to determine a total count of the plurality of refinement bits based on a defined bit-depth of the plurality of encoded data blocks and a total count of the plurality of entropy coded bits in the plurality of encoded data blocks. The defined bit-depth may correspond to a sum of the first plurality of bit-planes and the second plurality of bit-planes.

In accordance with an embodiment, the encoder circuitry may be further configured to set the first count of the plurality of entropy coded bits in the first encoded data block as a reference value. The encoder circuitry may be further configured to calculate a plurality of difference values between the reference value and the first count of the plurality of entropy coded bits in each encoded data block of the plurality of encoded data blocks. The encoder circuitry may be further configured to determine that a sum of the plurality of difference values is less than a total count of the plurality of refinement bits. The encoder circuitry may be further configured to select the first encoded data block from the plurality of encoded data blocks based on the determination that the sum of the plurality of difference values is less than the total count of the plurality of refinement bits. The encoder circuitry may be further configured to determine the first count of refinement bits for the first encoded data block based on the selection.

In accordance with an embodiment, the encoder circuitry may be further configured to determine a maximum count of refinement bits for the first encoded data block based on a block size of a sub-block of the plurality of sub-blocks and a count of the second plurality of bit-planes. The encoder circuitry may be further configured to determine the first count of refinement bits for the first encoded data block based on the first count of the plurality of entropy coded bits in the first encoded data block and the maximum count of refinement bits. The first count of refinement bits for the first encoded data block may be determined as a total count of the plurality of refinement bits, based the total count of the plurality of refinement bits that is lesser than the maximum count of refinement bits. The first count of refinement bits for the first encoded data block may be determined as the maximum count of refinement bits, based a total count of the plurality of refinement bits that is greater than the maximum count of refinement bits. The encoder circuitry may be further configured to allocate remaining count of refinement bits of the plurality of refinement bits in the second plurality of bit-planes of a second encoded data block of the plurality of encoded data blocks. The remaining count of refinement bits may be difference of the total count of the plurality of refinement bits and the maximum count of refinement bits.

In accordance with an embodiment, the encoder circuitry may be further configured to determine a second count of refinement bits of the plurality of refinement bits for a second encoded data block of the plurality of encoded data blocks, based on the quality measure. The encoder circuitry may be further configured to allocate the second count of refinement bits in the second plurality of bit-planes of the second encoded data block. The allocation of the second count of refinement bits in the second encoded data block may be independent of the allocation of the first count of refinement bits in the first encoded data block.

In accordance with an embodiment, each bit-position of a plurality of bit-positions in each bit-plane of the first plurality of bit-planes may comprise an entropy coded bit of the plurality of entropy coded bits. The encoder circuitry may be further configured to determine that a count of the first plurality of bit-planes is equal to a threshold value. The at least one bit-plane of the first plurality of bit-planes may comprise un-coded bit-positions. The encoder circuitry may be further configured to determine that the count of the first plurality of bit-planes is less than the threshold value. The encoder circuitry may be further configured to allocate a second count of refinement bits of the plurality of refinement bits at the un-coded bit-positions in the at least one bit-plane of the first plurality of bit-planes, prior to the determination of the first count of refinement bits.

In accordance with an embodiment, the encoder circuitry may be further configured to allocate the first count of refinement bits in the first encoded data block, in a sequence that starts from a most significant bit-plane of the second plurality of bit-planes.

In accordance with an embodiment, the image block may comprise a plurality of pixel values. Each sub-block of the plurality of sub-blocks may comprise at least two pixel values of the plurality of pixel values.

In accordance with an embodiment, the image block may comprise a plurality of pixel values. Each sub-block of the plurality of sub-blocks may comprise one of the plurality of pixel values. A total count of the plurality of sub-blocks may be equal to a total count of the plurality of pixel values.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An embedded codec (EBC) circuitry, comprising:
   encoder circuitry configured to:
      encode a plurality of sub-blocks of an image block by an entropy coding scheme to generate a plurality of encoded data blocks,
         wherein each encoded data block of the plurality of encoded data blocks comprises a first plurality of bit-planes and a second plurality of bit-planes, and
         wherein the first plurality of bit-planes comprises a plurality of entropy coded bits;
      determine a first count of refinement bits of a plurality of refinement bits, for a first encoded data block of the plurality of encoded data blocks, based on a quality measure of the plurality of encoded data blocks,
         wherein the quality measure represents a first count of the plurality of entropy coded bits in each encoded data block of the plurality of encoded data blocks; and
      allocate the first count of refinement bits in the second plurality of bit-planes of the first encoded data block.

2. The EBC circuitry according to claim 1, wherein the encoder circuitry is further configured to determine a total count of the plurality of refinement bits based on a defined bit-depth of the plurality of encoded data blocks and a total count of the plurality of entropy coded bits in the plurality of encoded data blocks, and
   wherein the defined bit-depth corresponds to a sum of the first plurality of bit-planes and the second plurality of bit-planes.

3. The EBC circuitry according to claim 1, wherein the encoder circuitry is further configured to:
   set the first count of the plurality of entropy coded bits in the first encoded data block as a reference value; and
   calculate a plurality of difference values between the reference value and the first count of the plurality of entropy coded bits in each encoded data block of the plurality of encoded data blocks.

4. The EBC circuitry according to claim 3, wherein the encoder circuitry is further configured to:
   determine that a sum of the plurality of difference values is less than a total count of the plurality of refinement bits;
   select the first encoded data block from the plurality of encoded data blocks based on the determination that the sum of the plurality of difference values is less than the total count of the plurality of refinement bits; and
   determine the first count of refinement bits for the first encoded data block based on the selection.

5. The EBC circuitry according to claim 1, wherein the encoder circuitry is further configured to determine a maximum count of refinement bits for the first encoded data block based on a block size of a sub-block of the plurality of sub-blocks and a count of the second plurality of bit-planes.

6. The EBC circuitry according to claim 5, wherein the encoder circuitry is further configured to determine the first count of refinement bits for the first encoded data block based on the first count of the plurality of entropy coded bits in the first encoded data block and the maximum count of refinement bits.

7. The EBC circuitry according to claim 6, wherein the first count of refinement bits for the first encoded data block is determined as a total count of the plurality of refinement bits, based the total count of the plurality of refinement bits that is lesser than the maximum count of refinement bits.

8. The EBC circuitry according to claim 6, wherein the first count of refinement bits for the first encoded data block is determined as the maximum count of refinement bits, based a total count of the plurality of refinement bits that is greater than the maximum count of refinement bits.

9. The EBC circuitry according to claim 8, wherein the encoder circuitry is further configured to allocate remaining count of refinement bits of the plurality of refinement bits in the second plurality of bit-planes of a second encoded data block of the plurality of encoded data blocks, and wherein the remaining count of refinement bits is difference of the total count of the plurality of refinement bits and the maximum count of refinement bits.

10. The EBC circuitry according to claim 1, wherein the encoder circuitry is further configured to:
    determine a second count of refinement bits of the plurality of refinement bits for a second encoded data block of the plurality of encoded data blocks, based on the quality measure; and
    allocate the second count of refinement bits in the second plurality of bit-planes of the second encoded data block, wherein the allocation of the second count of refinement bits in the second encoded data block is independent of the allocation of the first count of refinement bits in the first encoded data block.

11. The EBC circuitry according to claim 1,
    wherein each bit-position of a plurality of bit-positions in each bit-plane of the first plurality of bit-planes comprises an entropy coded bit of the plurality of entropy coded bits, and
    wherein the encoder circuitry is further configured to determine that a count of the first plurality of bit-planes is equal to a threshold value.

12. The EBC circuitry according to claim 11,
    wherein at least one bit-plane of the first plurality of bit-planes comprises un-coded bit-positions, and
    wherein the encoder circuitry is further configured to:
        determine that the count of the first plurality of bit-planes is less than the threshold value; and
        allocate a second count of refinement bits of the plurality of refinement bits at the un-coded bit-positions in the at least one bit-plane of the first plurality of bit-planes, prior to the determination of the first count of refinement bits.

13. The EBC circuitry according to claim 1, wherein the encoder circuitry is further configured to allocate the first count of refinement bits in the first encoded data block, in a sequence that starts from a most significant bit-plane of the second plurality of bit-planes.

14. The EBC circuitry according to claim 1,
    wherein the image block comprises a plurality of pixel values, and
    wherein each sub-block of the plurality of sub-blocks comprises at least two pixel values of the plurality of pixel values.

15. The EBC circuitry according to claim 1,
    wherein the image block comprises a plurality of pixel values, wherein each sub-block of the plurality of sub-blocks comprises one of the plurality of pixel values, and wherein a total count of the plurality of sub-blocks is equal to a total count of the plurality of pixel values.

16. A method, comprising:
in an embedded codec (EBC) circuitry that comprises encoder circuitry:
encoding, by the encoder circuitry, a plurality of sub-blocks of an image block by application of an entropy coding scheme to generate a plurality of encoded data blocks,
wherein each encoded data block of the plurality of encoded data blocks comprises a first plurality of bit-planes and a second plurality of bit-planes, and
wherein the first plurality of bit-planes comprises a plurality of entropy coded bits;
determining, by the encoder circuitry, a first count of refinement bits of a plurality of refinement bits, for a first encoded data block of the plurality of encoded data blocks, based on a quality measure of the plurality of encoded data blocks, and
wherein the quality measure represents a first count of the plurality of entropy coded bits in each encoded data block of the plurality of encoded data blocks; and
allocating, by the encoder circuitry, the first count of refinement bits in the second plurality of bit-planes of the first encoded data block.

17. The method according to claim 16, further comprising determining, by the encoder circuitry, a total count of the plurality of refinement bits based on a defined bit-depth of the plurality of encoded data blocks and a total count of the plurality of entropy coded bits in the plurality of encoded data blocks, wherein the defined bit-depth corresponds to a sum of the first plurality of bit-planes and the second plurality of bit-planes.

18. The method according to claim 16, further comprising:
setting, by the encoder circuitry, the first count of the plurality of entropy coded bits in the first encoded data block as a reference value; and
calculating, by the encoder circuitry, a plurality of difference values between the reference value and the first count of the plurality of entropy coded bits in each encoded data block of the plurality of encoded data blocks.

19. The method according to claim 18, further comprising:
determining, by the encoder circuitry, that a sum of the plurality of difference values is less than a total count of the plurality of refinement bits;
selecting, by the encoder circuitry, the first encoded data block from the plurality of encoded data blocks based on the determination that the sum of the plurality of difference values is less than the total count of the plurality of refinement bits; and
determining, by the encoder circuitry, the first count of refinement bits for the first encoded data block based on the selection.

20. The method according to claim 16, further comprising determining, by the encoder circuitry, a maximum count of refinement bits for the first encoded data block based on a block size of a sub-block of the plurality of sub-blocks and a count of the second plurality of bit-planes.

* * * * *